T. HOOCK.
SQUIRREL CAGE WINDING FOR INDUCTION MOTORS.
APPLICATION FILED JUNE 6, 1911.
1,096,840.
Patented May 19, 1914.
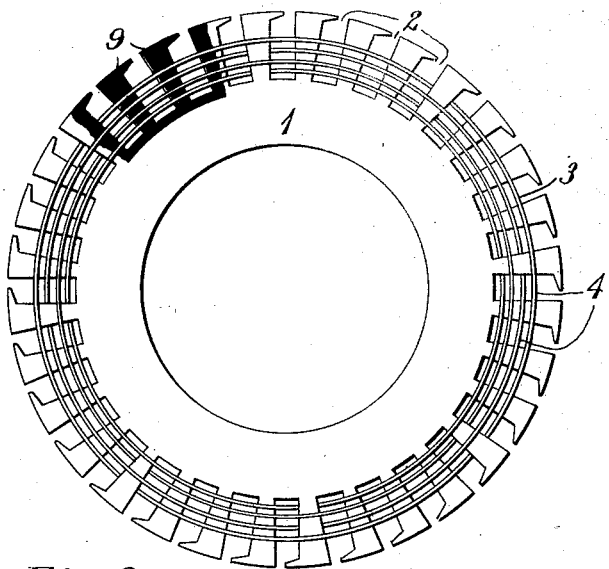
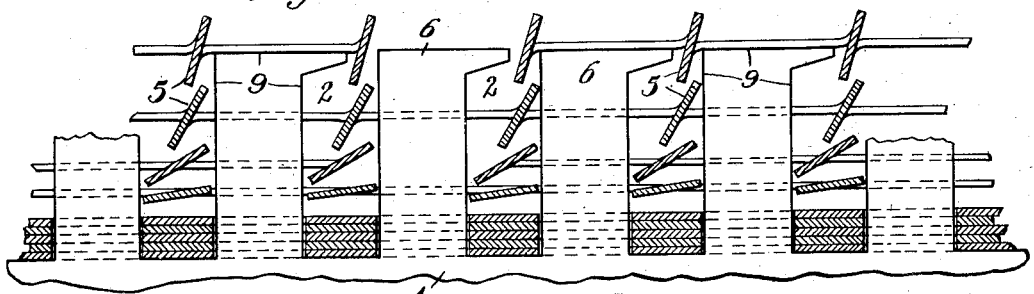
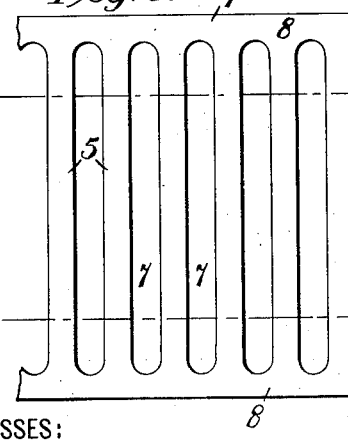 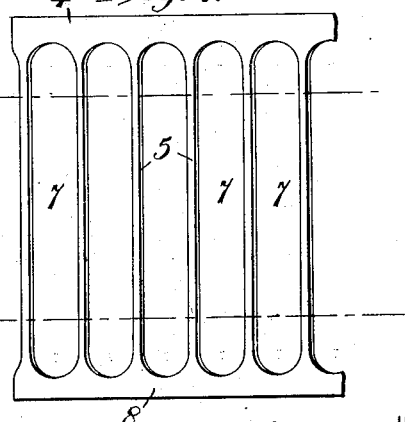
WITNESSES:
Fred H. Miller
INVENTOR
Theodore Hoock
BY
Wesley G. Carr
ATTORNEY

UNITED STATES PATENT OFFICE.

THEODORE HOOCK, OF WILKINSBURG, PENNSYLVANIA, ASSIGNOR TO WESTINGHOUSE ELECTRIC AND MANUFACTURING COMPANY, A CORPORATION OF PENNSYLVANIA.

SQUIRREL-CAGE WINDING FOR INDUCTION-MOTORS.

1,096,840.          Specification of Letters Patent.          Patented May 19, 1914.

Application filed June 6, 1911. Serial No. 631,596.

*To all whom it may concern:*

Be it known that I, THEODORE HOOCK, a subject of the Emperor of Germany, and a resident of Wilkinsburg, in the county of Allegheny and State of Pennsylvania, have invented a new and useful Improvement in Squirrel-Cage Windings for Induction-Motors, of which the following is a specification.

My invention relates to dynamo-electric machines and it has special reference to the secondary windings of induction motors.

The object of my invention is to provide a simple and relatively inexpensive winding of the squirrel-cage type for machines of the class above indicated which shall comprise sheet metal punchings and be adapted for use with core members having partially closed slots, and also an advantageous method of producing such winding.

According to my present invention, I provide a plurality of plates of sheet copper or other conducting material having a series of slots so arranged and spaced as to produce a grid, the bars of which are adapted to fit into the slots of the core member of an induction motor. The central portion of each bar is bent at an angle to the plate, in the punching process, in order to adapt the grid to core members having partially closed slots. After the bars are inserted in the slots, the twist is removed so that a maximum number of layers of grids or plates may be utilized in the winding. Finally the grids are riveted or otherwise secured together at their ends.

Figure 1 of the accompanying drawing is an end elevation of a core member which is provided with a portion of a squirrel cage winding arranged and constructed in accordance with my invention. Fig. 2 is a fragmentary view, on a larger scale, showing a portion of a similar core member of infinite radius, the secondary winding of my invention being shown in course of completion. Fig. 3 is a plan view of a plate or grid such as is embodied in the windings shown in Figs. 1 and 2, and Fig. 4 is a view, corresponding to Fig. 3, of the same grid having its bars bent ready to be inserted in the core slots.

Referring to the drawings, a magnetizable core member 1, having a plurality of partially closed peripheral slots 2 is provided with a squirrel cage winding 3. The winding comprises a plurality of ring segments or bent plates 4, which are preferably punched or stamped from sheet copper, or other suitable conducting material in the form of grids, having the central portions of their bars 5 bent at angles to the plane of the grid, as shown in Fig. 4 of the drawing. The core member is shown in Fig. 2 on a larger scale, the core teeth 6 being parallel as if they were a part of a cylindrical core member of infinite radius. A number of the grids are shown in position in the bottoms of the slots 2, the bars 5 then taking the form shown in Fig. 3 of the drawings, so that they lie in the planes of the grids and substantially fill the slot. Fig. 2 also clearly shows the ease with which the grids may be placed in position in the partially closed slots, on account of the inclination of the bars 5 as they pass through the slot openings. The slots 7 in the grids are preferably somewhat longer than the slots 2 in which they are located in order to permit the grids to be slipped first to one side and then to the other after they are placed in position, and thus facilitate the removal of the twist which is formed in the bars substantially at their points of connection to the end members 8 of the grids. After the core slots are completely filled with grids, the ends of which are made to overlap, as shown in Fig. 1 of the drawings, the end-connecting portions of the grids may be united by any desired means to constitute connecting end rings of the winding.

In order to materially strengthen the winding and adapt it for use with very high-speed rotors, it may be desirable, in some cases, to provide the ends of the grids with clamping rings in accordance with well known practice.

The structure of the winding and the method of placing it in position in the core slots is such as to render the use of ordinary insulating cells objectionable. I have found, however, that excellent results may be secured by dipping the core teeth in insulating varnish, or other suitable liquid capable of producing an insulating coating 9, on the walls of the slots.

Structural modifications may be effected in the winding within the spirit and scope of my invention, and I desire that only such limitations shall be imposed as are indicated in the appended claim.

I claim as my invention:

The combination with a dynamo-electric machine core having partially inclosed slots, of a plurality of overlapping one-piece sheet metal grids having superposed bars that are substantially of the same width as said slots and are substantially parallel to the bottoms thereof.

In testimony whereof, I have hereunto subscribed my name this 23rd day of May 1911.

THEODORE HOOCK.

Witnesses:
B. B. HINES,
M. CLARA MERZ.